June 28, 1949. H. L. SEIDEN 2,474,373
TOY WAGON

Filed March 30, 1946 3 Sheets-Sheet 1

INVENTOR
HERMAN L. SEIDEN
BY
ATTORNEYS

June 28, 1949.  H. L. SEIDEN  2,474,373
TOY WAGON
Filed March 30, 1946  3 Sheets-Sheet 2
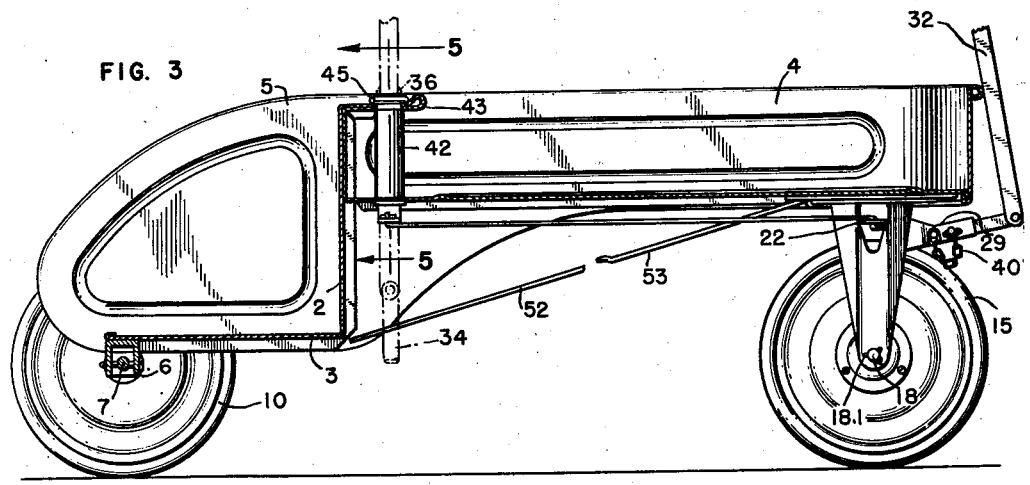
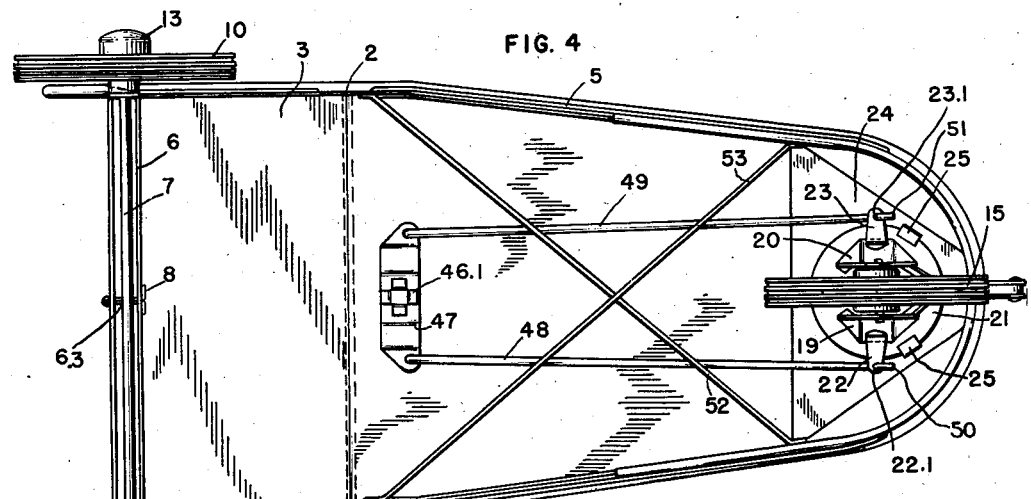
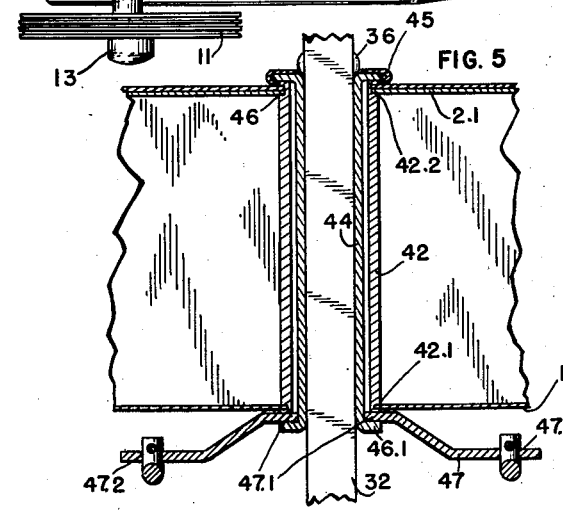
INVENTOR
HERMAN L. SEIDEN
BY
ATTORNEYS

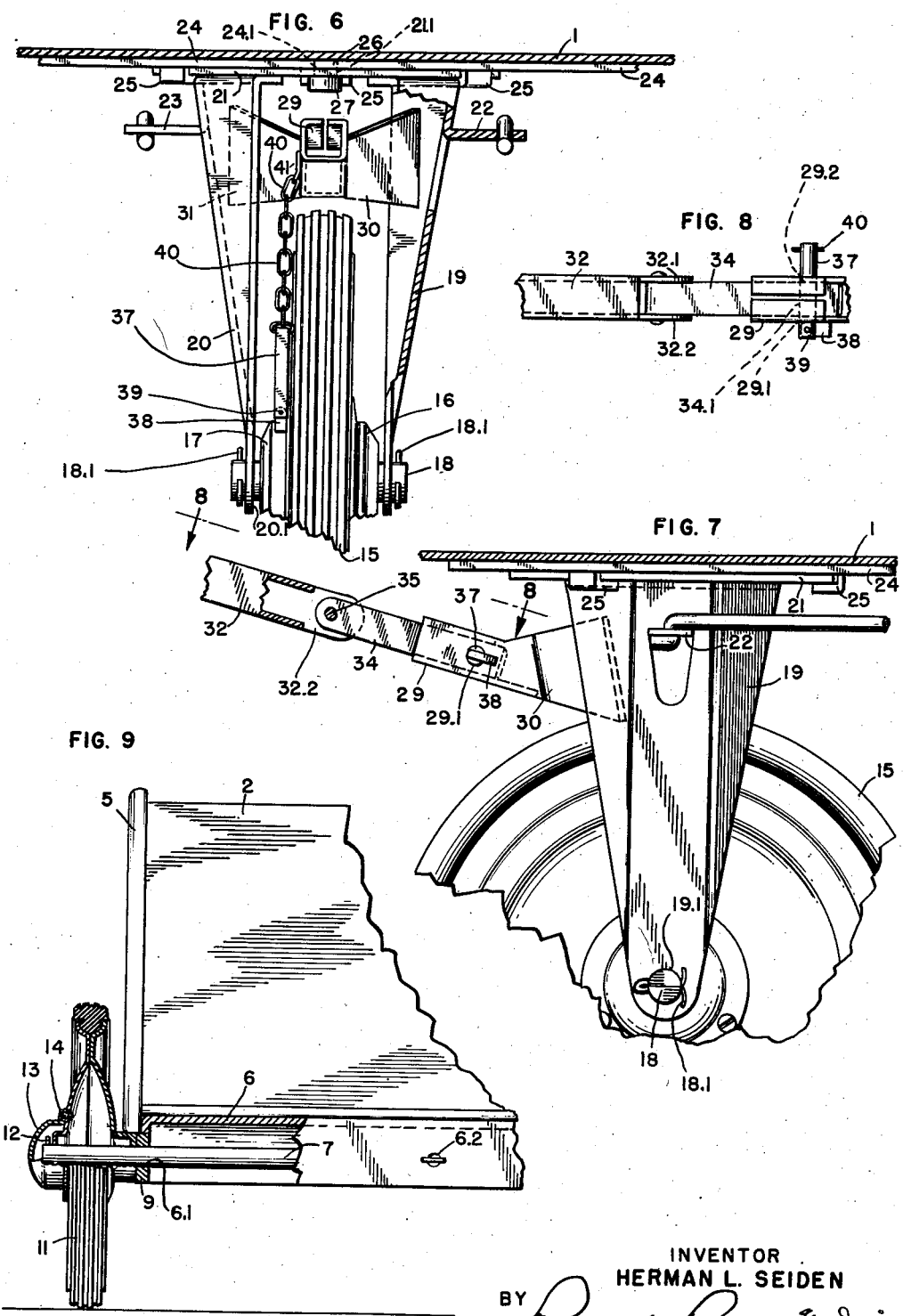

Patented June 28, 1949

2,474,373

UNITED STATES PATENT OFFICE 2,474,373

TOY WAGON

Herman L. Seiden, Chicago, Ill., assignor to Saul Patner, Chicago, Ill.

Application March 30, 1946, Serial No. 658,531

3 Claims. (Cl. 280—87.01)

This invention relates to improvements in vehicles and more particularly to a combination toy wagon and scooter steering mechanism.

In the past children have repeatedly tried to convert the conventional four-wheeled wagon into a scooter by kneeling in the wagon bed and propelling the wagon with the free leg. This practice led to many serious accidents and injuries because it was not possible to properly steer a four-wheeled wagon while in this position by the use of the wagon tongue. The conventional wagon was inherently unsafe for one of the purposes for which it was constantly used, namely: a down-hill ride with the occupants or occupant sitting in the wagon bed trying to steer with the conventional wagon tongue. It was also observed that any overloading or uneven distribution of weight quickly tipped the wagon over or made accurate steering impossible. It was to overcome these and other obvious defects that the present invention was conceived.

It is the primary object of this invention to combine a wagon, which may be used in the conventional manner, and a scooter, which may be operated by a child standing erect, into a unitary structure, and having a new and improved steering mechanism which is operable from the front of the vehicle or from a point adjacent the back of the vehicle.

Other objects of this invention are to provide a device of this character having three wheels; to provide a device of this character having two sets of steering mechanism synchronously joined together; to provide a device of this character having a steering handle or wagon tongue adaptable to be interchangeably used in either the forward or rear steering mechanism; to provide a device of this character with a body having a flat bed and an underslung platform; to provide a device of this character which will not be easily tipped over no matter where the majority of weights is placed on the wagon bed; to provide a device of this character which may be operatively steered by a person standing in a semi-erect position on a rear underslung platform, or may be pulled and steered in the conventional manner; to provide a new and improved steering mechanism for a vehicle of this character; and to provide a device of this character which is relatively simple and inexpensive to manufacture.

An illustrative embodiment of this invention is shown in the accompanying drawings in which:

Fig. 3 is a cross-sectional view taken on line 3—3 of Fig. 2.

Fig. 4 is a bottom plan view.

Fig. 5 is a cross-sectional view taken on line 5—5 of Fig. 3.

Fig. 6 is an enlarged end view of the front wheel and front steering mechanism, parts being shown broken away and parts being shown in section.

Fig. 7 is a fragmentary enlarged side view of the front wheel and front steering mechanism.

Fig. 8 is a fragmentary top view taken on the line 8—8 of Fig. 7.

Fig. 9 is a fragmentary end view showing one of the rear wheels secured to the axle, parts being shown broken away and in section.

Figure 1:
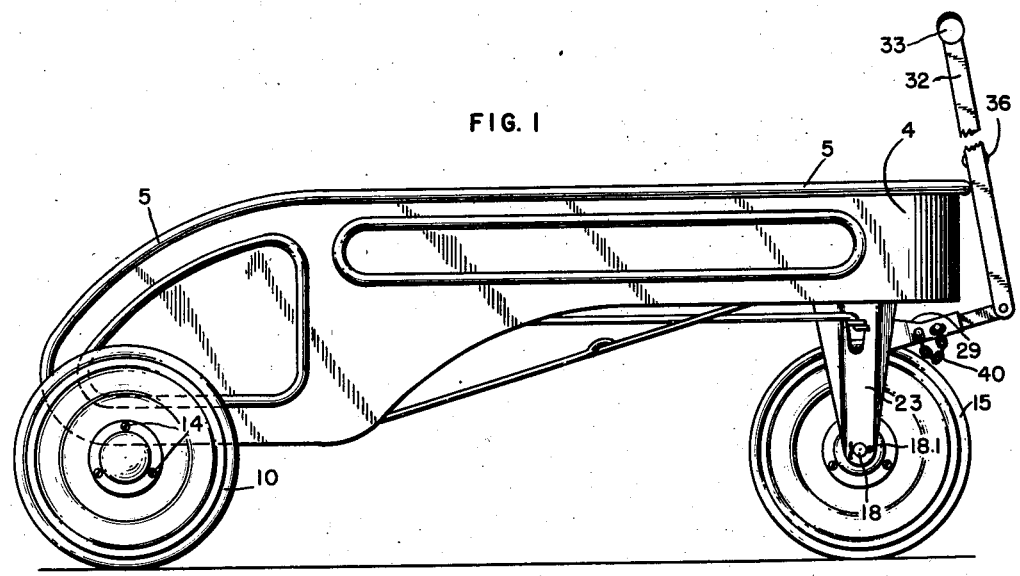
Figure 1 is a side elevational view of the device.
Figure 2:
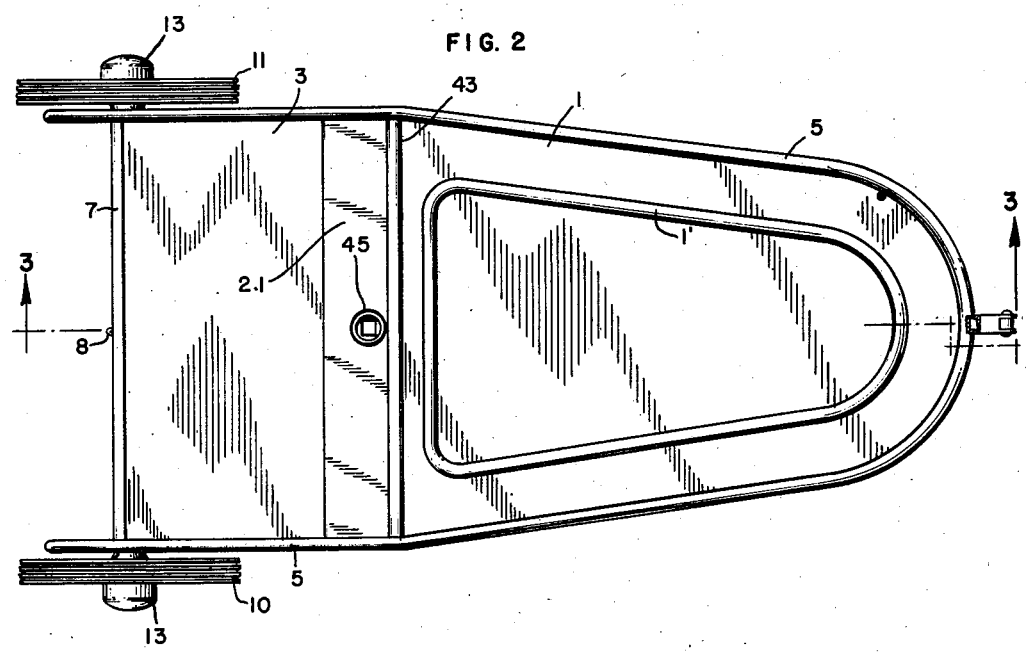
Fig. 2 is a top plan view thereof.

Referring in detail to the drawings, the vehicle comprises a substantially U-shaped chassis, an underslung platform integrally formed with and depending from the open-ended portion of the chassis, a combination front and rear steering mechanism, a steering handle or wagon tongue, a front wheel and a pair of rear wheels.

The U-shaped chassis is preferably formed of lightweight metal and comprises a flat, horizontally disposed bed 1 having an integrally formed reinforcing channel formed therein, a vertically positioned backboard or panel 2 integrally secured to the rear end of the bed 1 and extending across the width thereof and extending above and below the bed, and a horizontally disposed underslung platform 3 integrally secured in any suitable manner, such as by welding to the lower edge of the panel 2 and extending across the width thereof and rearwardly.

A hull 4, provided with a rolled upper edge 5, conforms generally to the shape of the chassis, extends around and above the chassis and is secured to the marginal edge of the bed 1, platform 3 and panel 2 in any suitable manner, such as by welding to form an open box-like structure, and provide side walls for the vehicle.

An axle mount or inverted U-shaped channel iron bearing block 6 is integrally secured in any suitable manner to the underside of the platform 3 at a point adjacent the rear end thereof, and extends across the width of the platform 3 to house the axle shaft 7. End plates 9 are integrally formed and positioned on both ends of the axle mount 6 and are provided with apertures 6.1 through which axle 7 is inserted and extends therebeyond. A bolt or cotter pin 8 extends through alined apertures 6.2 and 6.3, the axle mount 6 and the axle shaft 7 respectively to prevent the axle from turning in its mount. Wheels 10 and 11, preferably of the rubber-tired variety, are rotatably mounted on each end of axle shaft 7 and secured thereon in any suitable manner such as by cotter pins 12. Hub caps 13 are secured to the outer face of the wheels 10 and 11 in any suitable manner, such as by bolts or machine screws 14 to enclose the protruding ends of the axle shaft 7.

A front wheel 15, having bearing hubs 16 and 17 disposed on either side thereof respectively, is rotatably mounted on a short axle 18 which extends through and beyond the hubs 16 and 17. Wheel mounts 19 and 20 are positioned one on each side of the front wheel 15. The lower ends of each mount 19 and 20 are provided with apertures 19.1 and 20.1 respectively through which the ends of axle 18 extend. The axle 18 is held therebetween by bolts or cotter pins 18.1. The upper ends of the wheel mounts 19 and 20 are securely anchored to a circular revolving bearing plate 21 in any suitable manner, such as by welding or the like, whereby the plate 21 and the mounts 19 and 20 are integral with each other. Ears 22 and 23 are punched out from either side of the mounts 19 and 20 respectively and extend outwardly therefrom at approximately right angles and each is provided with an aperture 22.1 and 23.1.

A bolster plate 24, preferably formed from relatively heavy gauge sheet metal and generally triangular in shape, is securely mounted to the forward undersurface of the bed 1 in any suitable manner, such as by welding, and is provided with a plurality of depending hooked fingers 25 extending downwardly and inwardly from the plate 24. The fingers 25 are adapted to freely hold the circular bearing plate 21 adjacent the bolster plate 24 where the plate 21 is free to revolve and turn in and between said fingers 25 about pivot pin 26 which is threaded through a suitable bore 21.1 medially positioned in the bearing plate 21 and extends through bore 24.1 in the bolster plate 24 where it is securely anchored thereto; as will be apparent from Fig. 6 the bores 21.1 and 24.1 are in alinement with each other. An enlarged cap 27 is secured to the free end of the pin 26 to allow the bearing plate 21 to rotate freely on the pin 26.

The forward or front handle well comprises a hollow diagonally disposed neck or tube 29 which is preferably formed square in cross section, and which is adapted to receive the hereinafter described handle. The well is also provided with a pair of outwardly diverging side wings 30 and 31, the forward ends of which are integral with the sides of the neck 29 while the opposite ends thereof are secured in any suitable manner, such as by welding or the like, to the wheelmounts 19 and 20 respectively at a point below and clear of the bearing plate 21. (See Fig. 7.)

The steering handle comprises a relatively long shaft or tongue 32 having a cross bar or handle 33 integrally secured to and extending across the top end thereof, and a relatively short shaft 34 pivotally secured to the lower end of the tongue 32 by means of a pin 35 and between the walls 32.1 and 32.2 which extend from the lower end of shaft 32. A pin 36, threaded through the tongue 32, at a point above the pin 35, and extending beyond either side thereof, acts as a limit stop when the handle is used in the hereinafter described rear steering mechanism. The steering handle is fully disclosed in the co-pending application Serial No. 658,532, filed March 30, 1946, by Thomas C. Flanagan, now abandoned.

A locking pin 37 and having a short terminal finger 38 pivotally secured to one end thereof by means of a rivet 39 is threaded through alined apertures 29.1 and 29.2 contained in the neck 29 and a corresponding aperture or bore 34.1 in the short shaft 34 of the steering handle, whereupon the short finger 38 may be rotated at right angles (as shown in Fig. 8) to prevent accidental displacement of the steering handle therefrom. The chain 40 is secured at one end to the bar 37 on the end opposite the finger 38 and the other end thereof is anchored to the neck 29 by means of a rivet 41 or the like whereby the chain prevents the locking pin from becoming lost or misplaced.

The rear steering mechanism comprises a vertically disposed tube 42 having the lower end extending through and integrally secured as at 42.1 by any suitable means, to the base 1 at a point adjacent the panel 2 and medially of the sides of the hull 4. The upper end of the tube 42 is similarly anchored to the horizontally disposed panel 2.1, as at 42.2, whereby the tube is rigidly secured. A vertically extending steering handle-well adapted to receive the handle 32 comprises a hollow tube 44 (square in cross-section) having its terminal ends bent at right angles to form rigid flaps 46 and 46.1. The flap 46 spans the upper end of tube 42 and has a collar 45 integrally secured thereon. The flap 46.1 extends below the bed 1 and the lower end of the tube 42 whereby to receive the medial portion 47.1 of the steering arm 47. As will be apparent from Figs. 4 and 5, the portion 47.1 is provided with a square bore to receive the end of tube 44. The flap 46.1 is integrally secured to the portion 47.1 in any suitable manner, such as by welding.

Parallelly disposed steering rods 48 and 49 are secured one to each terminal end of the steering arm 47 and at their other ends to ears 22 and 23 respectively of the wheel mounts 19 and 20 respectively. The terminal ends of each rod 48 and 49 are provided with offsets or crimps 50 and 51 which are adapted to be inserted in the apertures 22.1 and 23.1 contained in the ears 22 and 23, and apertures 47.2 and 47.3 in the ends of steering arm 47. The handle 32 is inserted into the well 44 until further insertion is prevented by the limit pin 36 when it abuts against the collar 45. As the tube 44 and the handle tube 32 are both square in cross section, and the tube 44 is rotatable within the tube 42, any turning movement of the handle bar 33 will be transmitted to the steering arm 47, rods 48 and 49 and wheel mounts 19 and 20 and hence the front wheel 15.

Crossed brace rods 52 and 53 are secured at one end to opposite corners of the bolster plate 24 in any suitable manner, such as by welding, extend rearwardly and downwardly therefrom to the lower portion of the hull at a point adjacent the lower end of panel 2, where they are likewise secured thereto by any suitable means, such as by welding.

It will now be apparent that the vehicle may be steered by either the front or back steering mechanism by the same handle or tongue 32. When used in the front steering mechanism, the short pivoted arm 34 is inserted into the front handle well or neck 29 and is secured therein by the locking pin 37. The handle tongue 32 can then, due to its pivot 39, be used in any position from below or above, or in a horizontal plane to beyond a vertical plane. If desired, the steering handle can be removed from the front handle well, by removing the locking pin, and can be inserted into the rear steering well or tube 44 and used to operate the rear steering mechanism. When the rear steering arm 47 is turned the steering rods 48 and 49 exert pressure on the ears 22 and 23, thereby turning the bearing plate 21 which turns the wheel 15 in the direction indicated. It is to be understood that the rear mechanism is usually operated by the user standing in a semi-erect position on the underslung platform 3 with one foot thereon while using the other foot to apply power to the vehicle in the scooter fashion. Thus the vehicle may be used as a conventional wagon by using the steering handle in the front steering mechanism, or it may be used as a scooter by inserting the steering handle in the rear steering mechanism. It is obvious that no matter in which steering mechanism the handle is used, the front wheel only will be the wheel which is acted upon to steer the vehicle.

Although but one specific embodiment of this invention is herein shown and described, it will be understood that numerous details of the structure shown may be altered or omitted without departing from the spirit of the invention as defined by the following claims.

I claim:

1. A child's wagon and scooter, comprising a bed, a vertically disposed panel secured to the rear end of the bed, a platform secured to the lower edge of said panel and lying in a plane below the horizontal plane of said bed, a one pieced side wall for said bed and platform, a rear axle mount located at the rear marginal edge of said platform and secured at the bottom thereof, an axle contained in said mount, a pair of vertically positioned wheels secured to said axle, a front wheel and axle therefor, a front steering mechanism comprising a bolster plate secured to the front underside of said bed, a bearing plate rotatably positioned on said bolster plate, wheel mounts depending from said bearing plate, said axle for said front wheel being anchored to and between the front ends of said wheel mounts and said front wheel being positioned therebetween, a handle well rigidly secured to and extending forwardly from said wheel mounts, and a rear steering mechanism comprising a vertically extending tube, a rear handle well rotatably mounted in said tube, a steering arm integrally secured to the lower end of said handle well, and steering rods connected to said steering arm and said front wheel mounts, whereby said front and rear steering mechanisms are synchronously connected together and operate as a single unit.

2. A three-wheeled child's wagon comprising a bed, a vertically extending panel secured to the rear end of and extending above and below said bed, a platform secured to the lower edge of said panel and extending rearwardly therefrom, a one piece side wall for said bed and said platform, an axle mount extending across the width of said platform secured to the underside thereof and at the rear edge thereof, an axle secured in said mount, a pair of wheels secured to said axle, a front axle, a front wheel positioned on said front axle, a front steering mechanism comprising a bolster plate secured to the underside of said bed and adjacent the front end thereof, a plurality of gripping fingers depending from and integrally formed on said bolster plate, a bearing plate loosely secured to said bolster plate by said fingers, a downwardly extending pivot pin rigidly secured centrally to the bolster plate and extending through the bearing plate whereby said plate is rotatable thereabout, a pair of wheel mounts depending from and rigidly secured at one end to said bearing plate, said front axle being anchored to and spanning the lower ends of said wheel mounts, a handle well rigidly secured to and extending forwardly from said wheel mounts, a rear steering mechanism comprising a vertically extending bearing tube integrally secured to the said bed, a handle well, square in cross section, rotatably mounted in said bearing tube and adapted to turn freely therein, a steering arm integrally secured medially of its ends to the lower end of said handle well, steering rods connecting said front wheel steering mechanism with said rear steering mechanism, whereby said steering mechanisms are synchronously operated as a single unit and a steering handle adapted to seat in said handle wells.

3. A child's wagon and scooter comprising a bed, a vertically disposed panel secured to the rear end of the bed, a platform secured to the lower edge of said panel and lying in a plane below the horizontal plane of said bed, a rear axle carried by said platform and wheels carried thereon, a front wheel and axle carried by said bed, a front steering mechanism comprising a bolster plate secured to the front underside of said bed, a bearing plate rotatably positioned on said bolster plate, wheel mounts depending from said bearing plate, said axle for said front wheel being anchored to and between the front ends of said wheel mounts and said front wheel being positioned therebetween, a handle well rigidly secured to and extending forwardly from said wheel mounts, and a rear steering mechanism comprising a vertically extending tube, a rear handle well rotatably mounted in said tube, a steering arm integrally secured to the lower end of said rear handle well and steering rods connected to said steering arm and said front wheel mounts whereby said front and rear steering mechanisms are synchronously connected together and operate as a single unit.

HERMAN L. SEIDEN.

REFERENCES CITED

The following references are of record in the file of this patent:

UNITED STATES PATENTS

| Number | Name | Date |
| --- | --- | --- |
| 409,682 | Higham | Aug. 27, 1889 |
| 850,971 | Schildwachter | Apr. 23, 1907 |
| 902,965 | Howe et al. | Nov. 3, 1908 |
| 1,637,614 | Kohler | Aug. 2, 1927 |
| 1,678,836 | Wessborg | July 31, 1928 |
| 1,773,567 | Bradley | Aug. 19, 1930 |
| 1,806,961 | Waas | May 26, 1931 |
| 1,849,341 | Waas | Mar. 15, 1932 |
| 2,339,940 | Noros | Jan. 25, 1944 |